United States Patent [19]

Odaka et al.

[11] Patent Number: 5,198,856
[45] Date of Patent: Mar. 30, 1993

[54] CAMERA HAVING CAMERA-SHAKE DETECTING DEVICE

[75] Inventors: Yukio Odaka; Akira Akashi, both of Kanagawa, Japan

[73] Assignee: Canon Kabushiki Kaisha, Tokyo, Japan

[21] Appl. No.: 648,835

[22] Filed: Jan. 31, 1991

[30] Foreign Application Priority Data

Feb. 5, 1990 [JP] Japan .................................. 2-025482

[51] Int. Cl.[5] .............................................. G03B 7/08
[52] U.S. Cl. .................................................. 354/430
[58] Field of Search ................. 354/430, 435, 441–445, 354/465, 471, 474, 475, 289.12

[56] References Cited

U.S. PATENT DOCUMENTS

| | | | |
|---|---|---|---|
| 4,182,556 | 1/1980 | Tano et al. ............................ | 354/443 |
| 4,365,880 | 12/1982 | Kiuchi et al. ......................... | 354/442 |
| 4,448,510 | 5/1984 | Murakoshi ........................... | 354/289.12 |
| 4,462,671 | 7/1984 | Suzuki et al. ........................ | 354/430 |
| 4,959,680 | 9/1990 | Ishida et al. ......................... | 354/435 |

Primary Examiner—Russell E. Adams
Attorney, Agent, or Firm—Robin, Blecker, Daley & Driscoll

[57] ABSTRACT

A camera having a camera-shake detecting device is arranged to make a display indicating that a shake of the camera is undetectable only in cases where the camera shake is consecutively found to be undetectable for a given number of times while a camera-shake detecting action is repeatedly performed. This arrangement effectively prevents the display from being flickered by alternate displays of an undetectable state and a detectable state if the undetectable state is displayed every time the undetectable state of camera shake takes place.

16 Claims, 13 Drawing Sheets

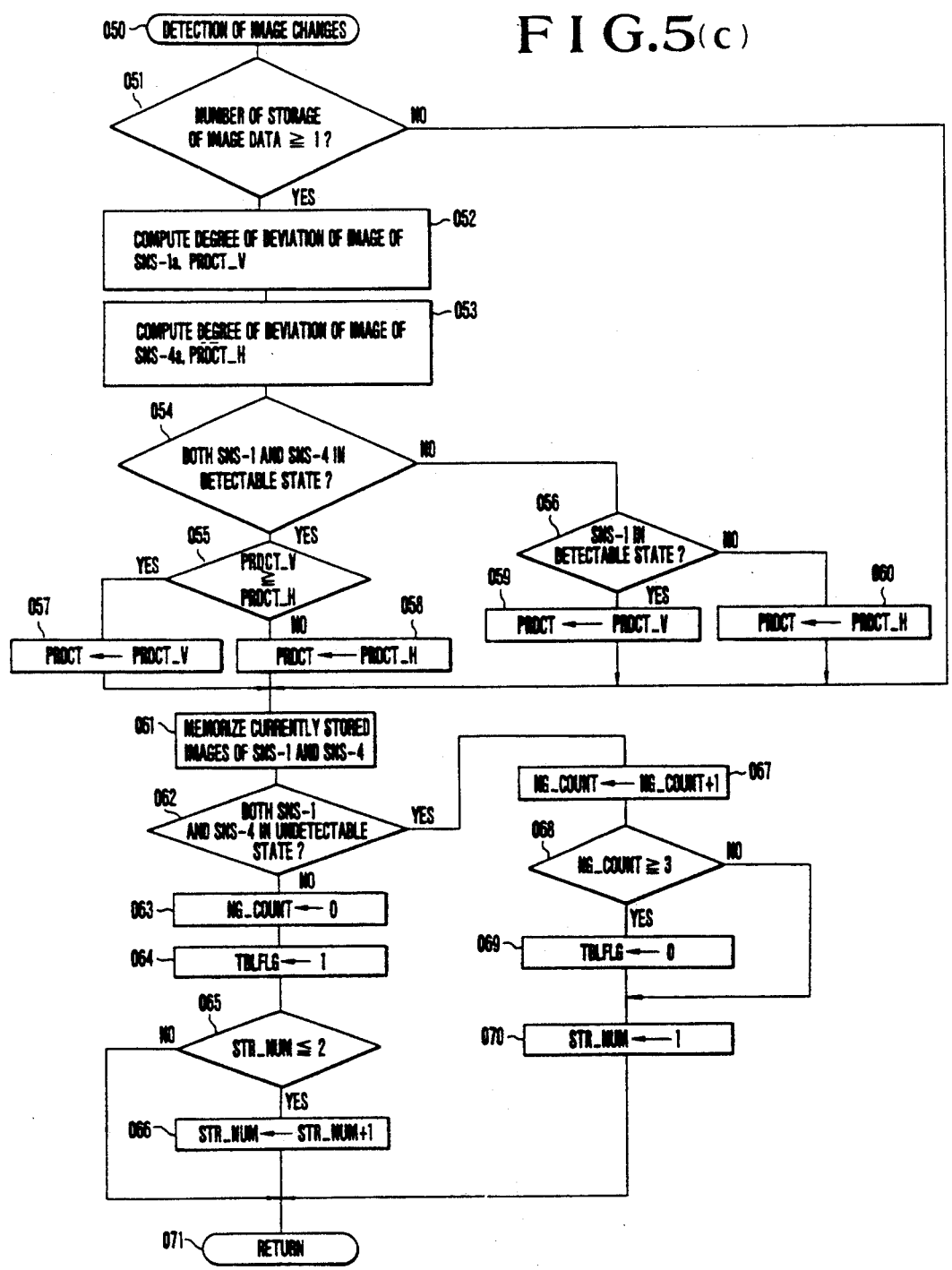

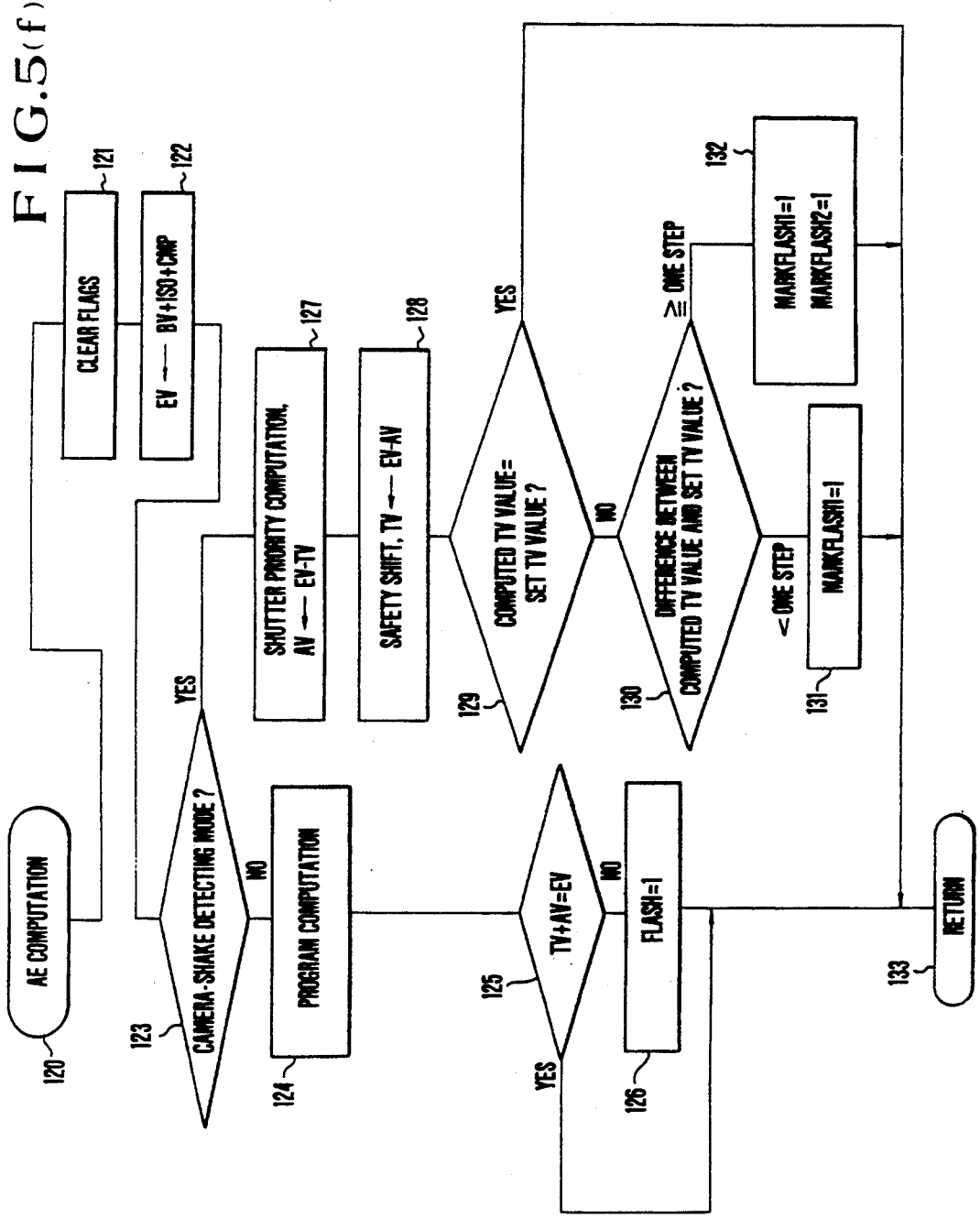

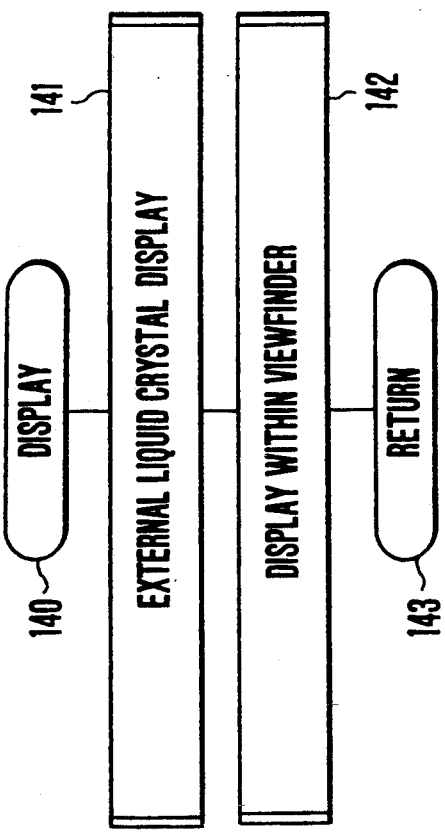
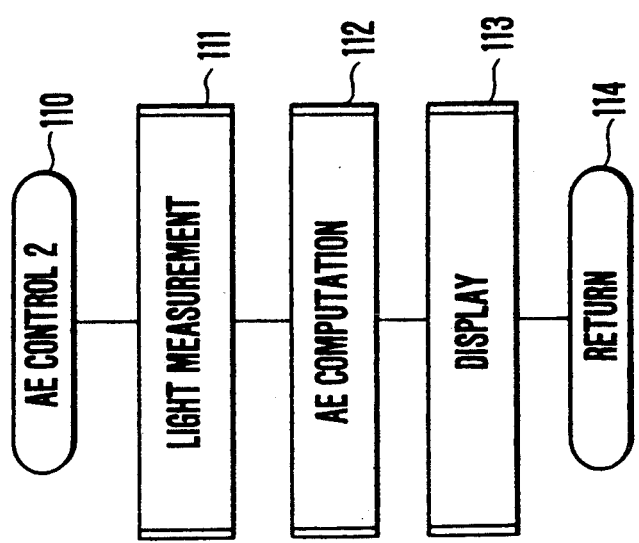

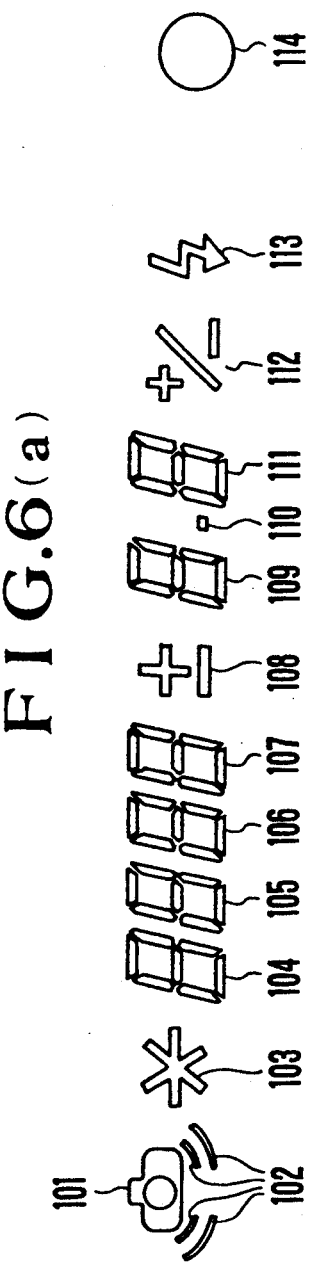

125     5.6

125     5.6

2HZ 125     5.6

2HZ

CAMERA HAVING CAMERA-SHAKE DETECTING DEVICE

BACKGROUND OF THE INVENTION

1. Field of the Invention

This invention relates to a camera having a camera-shake detecting circuit which is arranged to detect a camera shake by means of a camera-shake sensor.

2. Description of the Related Art

There has been proposed a camera which is arranged to obtain a camera-shake threshold time value on the basis of, for example, an image signal produced by a light receiving sensor by receiving the light of an object image and to take a photograph by setting a shutter speed at the camera-shake threshold time value thus obtained.

According to the prior art arrangement, however, it is impossible to know, before a shot, whether or not a set shutter time value is a time value which has been determined on the basis of the result of detection of a camera shake. Therefore, a shot might be taken on an erroneous assumption that the shutter time has automatically been set at a time value at which no blur of picture is caused by the camera shake. In cases where a camera-shake threshold time value is to be obtained by detecting an image signal as mentioned above, the image signal must be highly reliable. Therefore, the camera-shake threshold time value cannot be obtained in cases where the reliability of the image signal obtained by the sensor is low. However, it has been impossible to know the reliability of the image signal before taking a shot in accordance with the conventional arrangement.

Further, in the event of a low degree of luminance, the aperture of the lens of the camera must be shifted toward its maximum position for obtaining a correct exposure. However, if, in that event, the camera-shake threshold time value detected is a high shutter speed time, it might be impossible to obtain any correct exposure by shifting the aperture toward the maximum aperture. In such a case, the set shutter time must be shifted to a lower speed value. Therefore, in such a case, the shutter time which has been set at the camera-shake threshold time value by a camera-shake detecting action is automatically shifted to a lower shutter speed value. Under such a condition, a shot tends to be taken in an erroneous belief that the shot is to be taken at the camera-shake threshold time value.

Further, in cases where a shutter time value is arranged to be displayed in computing the camera-shake threshold time value, the camera-shake threshold time value becomes no longer obtainable if the reliability of the image signal lowers too much for detection. It is conceivable to solve this problem by making the display blank. However, making such a blank display every time an undetectable state occurs tends to make the shutter time display unstable. Besides, the conventional method requires a long period of time before completion of the camera-shake detecting action. If the shutter time display is left blank during the long detecting process, it would make the photographer feel uneasy.

SUMMARY OF THE INVENTION

It is an object of this invention to provide a camera which includes indication means for indicating that the reliability of the output of a sensor such as an image signal is too low for obtaining a camera-shake threshold time value and, in such a case, to enable the photographer to know beforehand whether or not a camera-shake threshold time value has been set to a shutter time.

It is another object of the invention to provide a camera wherein, in view of the fact that the above-stated indication means repeatedly performs an indicating action if the reliability of the image signal periodically changes because of an unstable state of the image signal detected in repeatedly detecting the camera-shake threshold time value, the indication means is allowed to indicate the impossibility of camera-shake detection only when the reliability of the image signal continues to be low over a given period of time (for a given number of detecting times), so that the indicating state can be prevented from periodically changing.

It is a further object of the invention to provide a camera which is arranged to shift a shutter time to a lower speed value than the camera-shake threshold time value in cases where a correct exposure is impossible at the camera-shake threshold time value and to inform the photographer of the impossibility of photographing at the camera-shake threshold time value by indicating that the shutter time has been shifted.

It is a still further object of the invention to provide a camera which is arranged to stabilize a shutter time display by displaying a camera-shake threshold time value when the camera-shake threshold time value has been obtained; by displaying a shutter time value obtained on the basis of a measured light value when the camera-shake threshold time value is in the process of being computed; and by displaying a previously obtained camera-shake threshold time value when the current camera-shake threshold time value has become undetectable in the process of displaying the current camera-shake threshold time value.

These and further objects and features of the invention will become apparent from the following detailed description of an embodiment thereof taken in conjunction with the accompanying drawings.

BRIEF DESCRIPTION OF THE DRAWINGS

FIGS. 5(a) to 5(h) are flow charts showing the operation of the camera of FIG. 2. FIGS. 6(a) to 6(f) show the various display states of the camera according to the invention.

DETAILED DESCRIPTION OF THE PREFERRED EMBODIMENT

Figure 3:
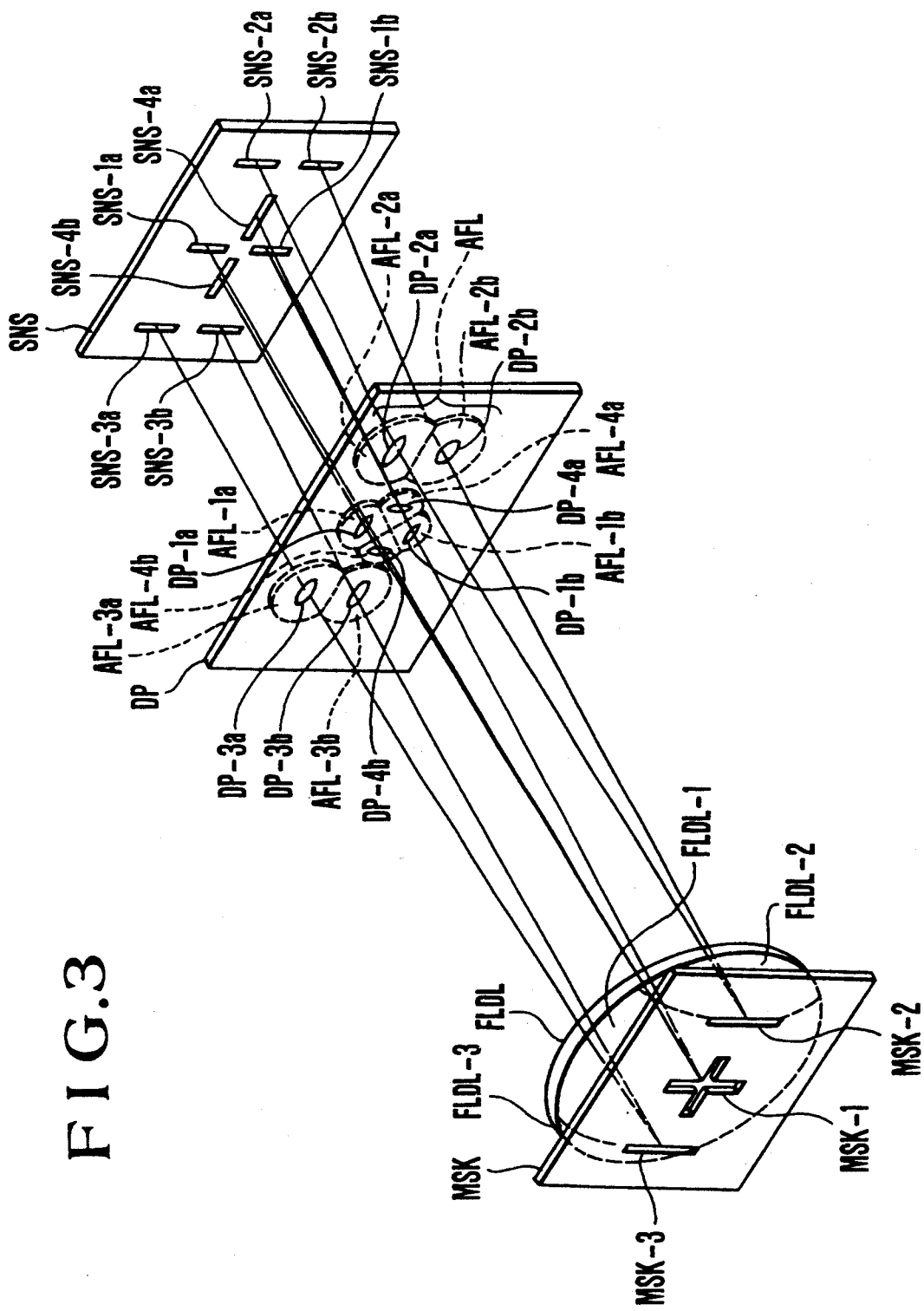
FIG. 3 shows the arrangement of a focusing optical system included in the camera of FIG. 2.

The following describes in detail the present invention through a preferred embodiment thereof shown in the accompanying drawings:

FIG. 3 shows in outline a focus detecting device used for a camera which is arranged as an embodiment of the invention. Referring to FIG. 3, a field mask MSK is provided with a cross-shaped aperture part MSK-1 which is formed in the middle part of the mask; and vertical oblong aperture (slot) parts MSK-2 and MSK-3 which are formed in the peripheral parts on two sides of the mask. A field lens FLDL consists of three parts FLDL-1, FLDL-2 and FLDL-3 corresponding to the three aperture parts MSK-1, MSK-2 and MSK-3. A diaphragm DP is provided with four apertures DP-1a, DP-1b, DP4a and DP-4b which are vertically and horizontally arranged in pairs in a central part thereof; and a pair of apertures DP-2a and DP-2b and another pair of apertures DP-3a and DP-3b which are arranged in left and right peripheral parts thereof respectively. The three parts (or areas) FLDL-1, FLDL-2 and FLDL-3 of the above-stated field lens FLDL are arranged to form images of the aperture pairs DP-1, DP-2 and DP3 near the exit pupil of an objective lens which is not shown. A secondary image forming lens AFL consists of a total of eight, consisting of four pairs, of lenses AFL-1a, AFL-1b, AFL-4a, AFL-4b, AFL-2a, AFL-2b, AFL-3a and AFL-3b. They are disposed in rear of the corresponding apertures of the diaphragm DP respectively. A sensor SNS consists of a total of eight, consisting of four pairs, of sensor arrays SNS-1a, SNS-1b, SNS-4a, SNS-4b, SNS-2a, SNS-2b, SNS-3a and SNS-3b. They are arranged to receive the light images formed by the corresponding lenses of the secondary image forming lens AFL. Object images formed on each pair of the sensor arrays are close to each other when the focus of a photo-taking lens is in front of the film plane and are away from each other when the focus is in rear of the film plane. The degree of displacement of these object images relative to each other is in a specific functional relation to the out-of-focus degree (hereinafter called defocus degree) of the photo-taking lens. Therefore, the defocus degree is detectable through an apposite computing operation on the outputs of pairs of the sensor arrays.

The arrangement described above enables the embodiment to measure by means of the objective lens which is not shown a distance to an object to be photographed and located around the middle part of a shootable or sightable range, even in such a case where the object has its light quantity distribution varying only in one direction upward, downward, to the right or to the left. A distance to an object located in a position corresponding to the peripheral aperture part MSK-2 or MSK-3 of the field mask MSK also can be measured.

Figure 4:
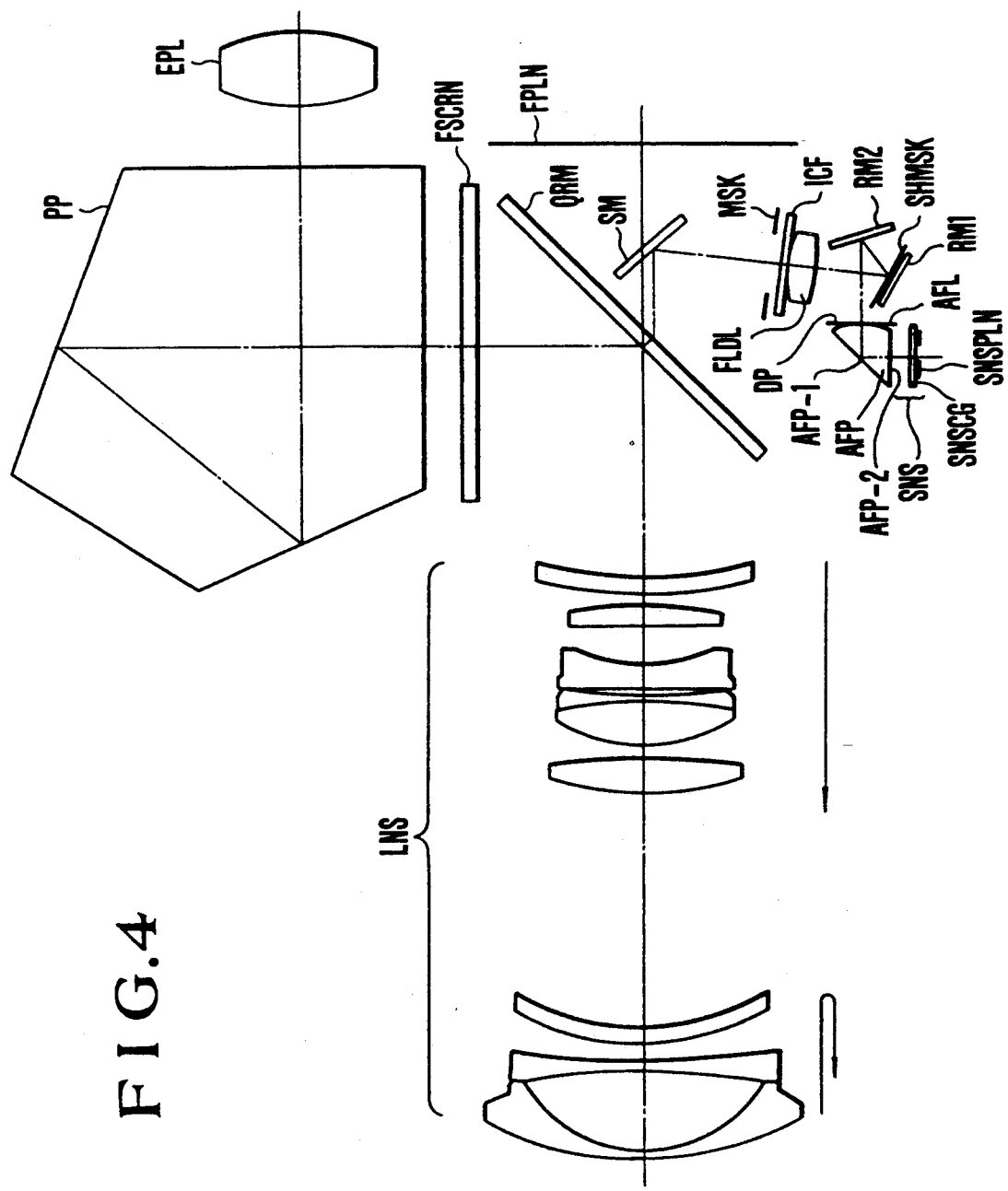
FIG. 4 schematically shows the mechanism of the camera of FIG. 2.

FIG. 4 shows the focus detecting device having the focus detection system of FIG. 3 in a state of being arranged within a camera. The illustration includes the photo-taking lens LNS; a quick-return mirror QRM; a focusing screen FSCRN; a pentagonal prism PP; an eyepiece lens EPL; the film plane FPLN; a sub-mirror SM; a field mask MSK; an infrared cut filter ICF; a field lens FLDL; first and second reflection mirrors RM1 and RM2; a light shield mask SHMSK; a diaphragm DP; a secondary image forming lens AFL; a prism member AFP which has a reflection face AFP-1 and an exit face AFP-2; and the sensor SNS which has a cover glass SNSCG and a light receiving plane SNSPLN.

The prism member AFP has the reflection face AFP-1 with a metal reflection film such as aluminum or the like applied thereto by a vapor deposition process and is arranged to reflect a light flux coming from the secondary image forming lens AFL in such a way as to deflect it to the exit face AFP-2 thereof.

Figure 2:
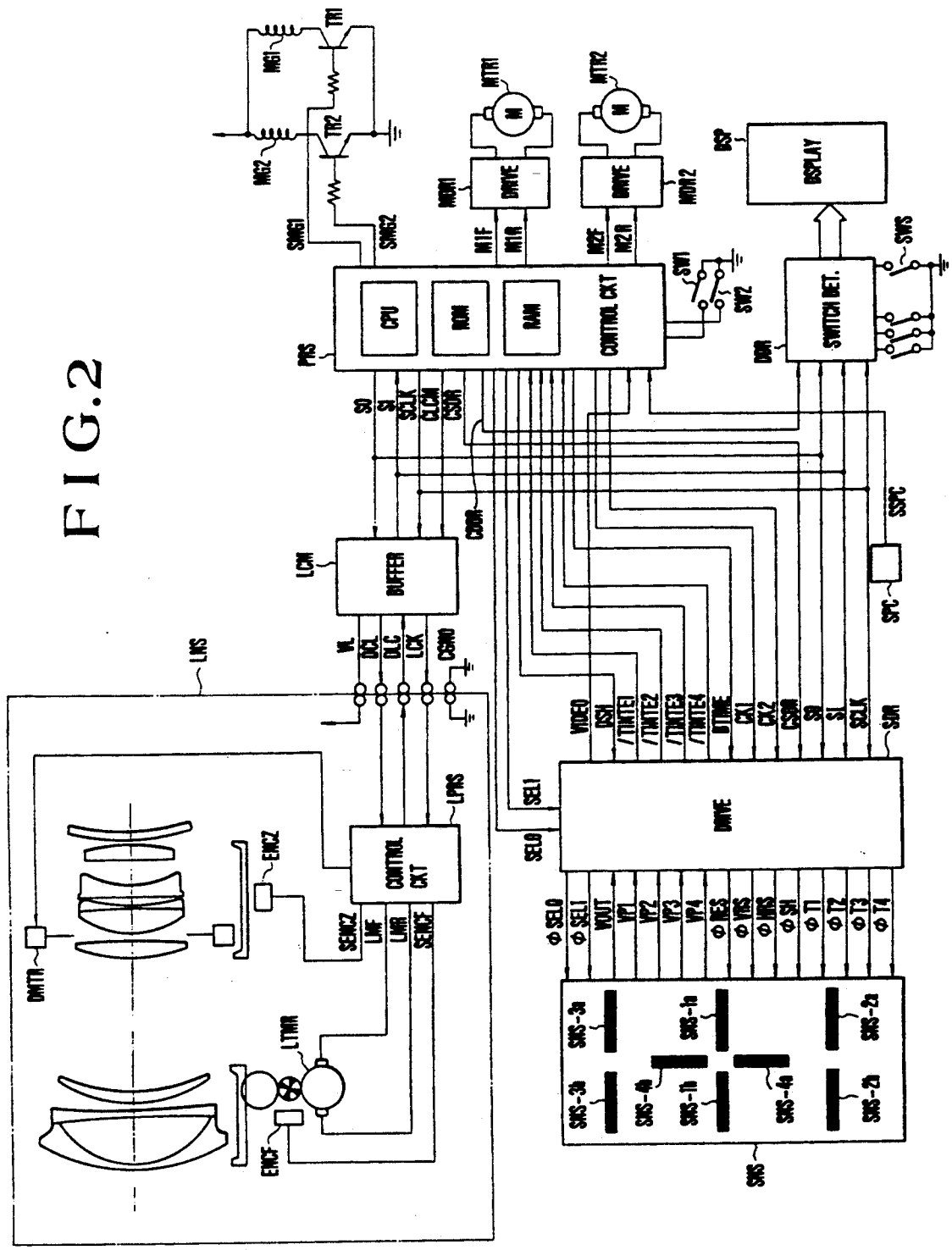
FIG. 2 is a circuit diagram showing a camera arranged as an embodiment of the invention.

FIG. 2 is a circuit diagram showing by way of example the arrangement of the camera which is provided with the focus detecting device of FIGS. 3 and 4. Each part of the circuit is arranged as described below:

Referring to FIG. 2, the control device PRS of the camera is, for example, composed of a one-chip microcomputer which includes a CPU (central processing unit), a ROM, a RAM and an analog-to-digital (A/D) converting part. The microcomputer PRS performs a sequence of camera actions in accordance with a sequence program of the camera including automatic exposure control, automatic focus adjustment (focusing), film winding, film rewinding, etc. For this purpose, the microcomputer PRS controls the actions of various circuits and the lens by communicating with peripheral circuits and the internal control device of the lens through communication signals SO, SI and SCLK and communication selection signals CLCM, CSDR and CDDR. The microcomputer PRS is arranged to produce a data signal SO and to receive a data signal SI. A synchronizing clock signal SCLK is produced for the data signals SO and SI.

A lens communication buffer circuit LCM is arranged to supply the power to a lens power supply terminal VL while the camera is in operation and to act as a buffer for communication between the camera and the lens when the selection signal CLCM is output from the microcomputer PRS at a high potential level (hereinafter a high potential level will be abbreviated to "H" and a low potential level to "L").

When the microcomputer PRS outputs the selection signal CLCM at "H" and sends data as the signal SO in synchronism with the clock signal SCLK, the buffer circuit LCM outputs buffer signals LCK and DCL for the signals SCLK and SO. These buffer signals LCK and DCL are supplied to the lens via communication contacts provided between the camera and the lens. At the same time, the buffer circuit LCM outputs the signal SI as a buffer signal for a signal DCL output from the lens LNS. The microcomputer PRS receives this signal SI as data on the lens in synchronism with the signal SCLK.

A switch detection and display circuit DDR is arranged to be selected when the signal CDDR is at "H" and controlled by the microcomputer PRS through the signals SO, SI and SCLK. In other words, the switch detection and display circuit DDR changes a display made by the display member DSP of the camera from one display over to another according to data sent from the microcomputer PRS or informs the microcomputer PRS of the on- or off-state of each of operation members of the camera.

Switches SW1 and SW2 are interlocked with a shutter release button which is not shown. The switch SW1 is turned on by the first stroke of a pushing operation on the release button. The switch SW2 is turned on by the second stroke of the pushing operation on the release button. The microcomputer PRS causes the camera to measure light and to automatically adjust focus when the switch SW1 is turned on, and to control an exposure and film winding after the exposure when the switch SW2 is turned on. Further, the switch SW2 is connected to an interruption input terminal of the microcomputer PRS. Therefore, even during the process of a program part to be executed when the switch SW1 is turned on, an interruption is allowed by the switch SW2 and then the control can be immediately shifted to a given interruption program.

A motor MTR1 is provided for film feeding. A motor MTR2 is provided for moving the mirror down and for charging a shutter spring. These motors MTR1 and MTR2 are controlled respectively by driving circuits MDR1 and MER2 in such a way as to be caused to make forward or reverse rotation. The microcomputer PRS supplies signals M1F, M1R, M2F and M2R for this purpose to these driving circuits MDR1 and MDR2.

Magnets MG1 and MG2 are arranged to start the travel of leading and trailing shutter curtains and to be energized with current by amplifying transistors TR1 and TR2 under the shutter control of the microcomputer PRS.

The switch detection and display circuit DDR, the motor driving circuits MDR1 and MDR2 and the shutter control are not directly related to this invention and, therefore, are omitted from further description.

A control circuit LPRS is disposed within the photo-taking lens LNS. The control circuit LPRS receives a signal DCL in synchronism with a clock signal LCK. The signal DCL carries data of instructions given from the camera to the photo-taking lens LNS. The actions of the lens in response to the instructions are predetermined. Upon receipt of the instruction signal DCL, the control circuit LPRS analyzes it through given procedures and performs focus adjustment and aperture control. The control circuit LPRS produces the output signal DLC thereof carrying information on the operating states of various parts, including the driven state of the focusing optical system, that of the diaphragm, etc., and various parameters including a maximum aperture F number, a focal length, and the coefficient of a relation between a defocus degree and the shifting degree of the focusing optical system.

In the case of this embodiment, the photo-taking lens LNS is a zoom lens. Upon receipt of an instruction from the camera for focus adjustment, signals LMF and LMR are output from the control circuit LPRS to drive a focusing motor LTMR so as to move the focusing optical system in the direction of the optical axis in accordance with data on the driving degree and direction sent along with the instruction. The moving degree of the optical system is measured by detecting the pattern of a pulse disc which rotates along with the optical system by means of a photo-coupler. An encoder circuit ENCF produces a number of pulses as a pulse signal SENCF according to the moving degree of the optical system. The pulse signal SENCF is monitored and counted by a counter disposed within the control circuit LPRS. When the counted value comes to coincide with a lens moving degree sent to the control circuit LPRS, the circuit LPRS controls the motor LMTR by lowering the level of the signals LMF and LMR to "L" (low level).

Therefore, after the instruction for focus adjustment is sent from the camera, the microcomputer PRS which is employed as the control device of the camera has nothing to do with the lens driving action until completion thereof on the side of the lens. Further, the control circuit LPRS of the lens is arranged to send the content of the above-stated counter to the camera upon receipt of a request from the camera.

When an instruction is sent from the camera to the lens for control over the diaphragm, the control circuit LPRS within the lens drives a known stepping motor DMTR for driving the diaphragm in accordance with data on a number of stopping-down steps received along with the diaphragm control instruction. The diaphragm control requires no encoder for monitoring as the stepping motor can be controlled by open control.

An encoder circuit ENCZ is provided for a zoom optical system. The control circuit LPRS detects a zooming position by receiving a signal SENCZ from the encoder circuit ENCZ. Within the control circuit LPRS, there are stored lens parameters for various zoom positions. Upon receipt of a request from the microcomputer PRS which is on the side of the camera body, the control circuit LPRS on the side of the lens sends one of the parameters corresponding to the current zoom position of the lens.

A light measuring sensor SPC is provided for exposure control and is arranged to receive light through the photo-taking lens from an object to be photographed. The output SSPC of the sensor SPC is supplied to an analog input terminal of the microcomputer PRS. The output SSPC is then A/D converted and, after that, is used for automatic exposure control in accordance with a predetermined program.

A sensor driving circuit SDR is provided for driving the focus detecting line sensor SNS. When the signal CSDR is at "H", the driving circuit SDR is selected to be controlled by the microcomputer PRS by using the signals SO, SI and SCLK. The driving circuit SDR is arranged to supply signals $\phi$SEL0 and $\phi$SEL1 which are identical with signals SEL0 and SEL1 which are output from the microcomputer PRS. When the signal $\phi$SEL0 is at "L" and the signal $\phi$SEL1 is also at "L", the sensor array pair SNS-1 (SNS-1a and SNS-1b) is selected. When the signal $\phi$SEL0 is at "H" and the signal $\phi$SEL1 at "L", the sensor array pair SNS-4 (SNS-4a and SNS-4b) is selected. When the signal $\phi$SEL0 is at "L" and the signal $\phi$SEL1 at "H", the sensor array pair SNS-2 (SNS-2a and SNS-2b) is selected. When the signal $\phi$SEL0 is at "H" and the signal $\phi$SEL1 is also at "H", the sensor array pair SNS-3(SNS-3a and SNS-3b) is selected.

With the signals SEL0 and SEL1 suitably set after completion of storage of electric charge, clock signals $\phi$SH and $\phi$HRS are sent from the driving circuit SDR to the sensor SNS. As a result of this, the image signals of the sensor array pair selected by the signal SEL0 and SEL1 ($\phi$SEL0 and $\phi$SEL1) are serially output from an output terminal VOUT.

Object luminance monitoring sensors which are disposed near the sensor array pairs SNS-1 (SNS-1a and SNS-1b), SNS-2 (SNS-2a and SNS-2b), SNS-3 (SNS-3a and SNS-3b) and SNS-4 (SNS-4a and SNS-4b) respectively produce monitor signals VP1, VP2, VP3 and VP4. The storage made by sensor arrays is controlled by using these monitor signals as the voltages of the monitor signals increase when the storage begins.

Signals $\phi$RES and $\phi$VRS are clock signals for resetting the sensors. Signals $\phi$HRS and $\phi$SH are clock signals for reading out the image signal. Signals $\phi$T1, $\phi$T2, $\phi$T3 and $\phi$T4 are clock signals for bringing the storage made by the sensor array pairs to an end respectively.

The output VIDEO of the sensor driving circuit SDR is an image signal amplified by a gain determined by the luminance of the object after a difference between the image signal VOUT and a dark current output from the sensor SNS is obtained. The dark current output represents the output value of picture elements which are blocked from light among the sensor array. The sensor driving circuit SDR retains the output of the light-blocked picture elements at a capacitor and to amplify a difference between this output and the image signal. The circuit SDR supplies its output VIDEO to the analog input terminal of the microcomputer PRS. The microcomputer PRS then A/D converts this signal (output) and serially stores the digital values thus obtained.

The circuit SDR also produces signals /TINTE1, /TINTE2, /TINTE3 and /TINTE4 which are arranged to indicate that the electric charges stored by the sensor array pairs SNS-1 (SNS-1a and SNS-1b), SNS-2 (SNS-2a and SNS-2b), SNS-3 (SNS-3a and SNS-3b) and SNS-4 (SNS-4a and SNS-4b) come into an adequate state and to show thereby completion of storage of the electric charges. The microcomputer PRS reads out the image signal by receiving these signals. A signal BTIME is applied to the sensor driving circuit SDR to define timing for determining the reading gain of an image signal amplifier disposed within the sensor driving circuit SDR. Normally, the circuit SDR is arranged to determine the reading gain of each sensor array pair on the basis of the voltage of the corresponding monitor signal VP0, VP1, VP2 or VP3 obtained at the point of time when the level of this signal BTIME becomes "H".

Reference clock signals CK1 and CK2 are supplied from the microcomputer PRS to the sensor driving circuit SDR for the purpose of forming the clock signals $\phi$RES, $\phi$VRS, $\phi$HRS and $\phi$SH. The sensor device SNS begins to perform its storing action when a predetermined "storage start command" is sent from the microcomputer PRS to the sensor driving circuit SDR by producing the communication selection signal CSDR at "H". Then, the four sensor array pairs photoelectrically convert an object image formed on each of them. Electric charge is stored at the photo-electric conversion element part of the sensor. At the same time, the voltage levels of the signals VP1 to VP4 of the luminance monitoring sensors increase. When this voltage reaches a given level, the sensor driving circuit SDR causes the levels of the signals /TINTE1 to /TINTE4 to individually become "L".

Upon receipt of these signals, the microcomputer PRS produces the clock signal CK2 in a given wave form. In accordance with this clock signal CK2, the sensor driving circuit SDR forms the clock signals $\phi$SH and $\phi$HRS and supplies these clock signals to the sensor device SNS. The sensor device SNS then produces an image signal according to these clock signals. The microcomputer PRS performs its internal A/D converting function to A/D convert, in synchronism with the clock signal CK2 produced by itself, the signal VIDEO which is received at its analog input terminal. A digital signal obtained through this A/D conversion is serially stored at applicable addresses in the RAM of the microcomputer PRS.

The operations of the sensor driving circuit SDR and the sensor device SNS are similar to a focus detecting device having two pairs of sensor arrays which was disclosed in Japanese Laid-Open Patent Application No. SHO 63-216905. The details of them are, therefore, omitted herein. As described above, the microcomputer PRS is arranged to receive image information on the object image formed on each pair of sensor arrays and to detect the defocus degree of the photo-taking lens by carrying out a predetermined focus detecting computing operation on the image information received.

Figure 5A:
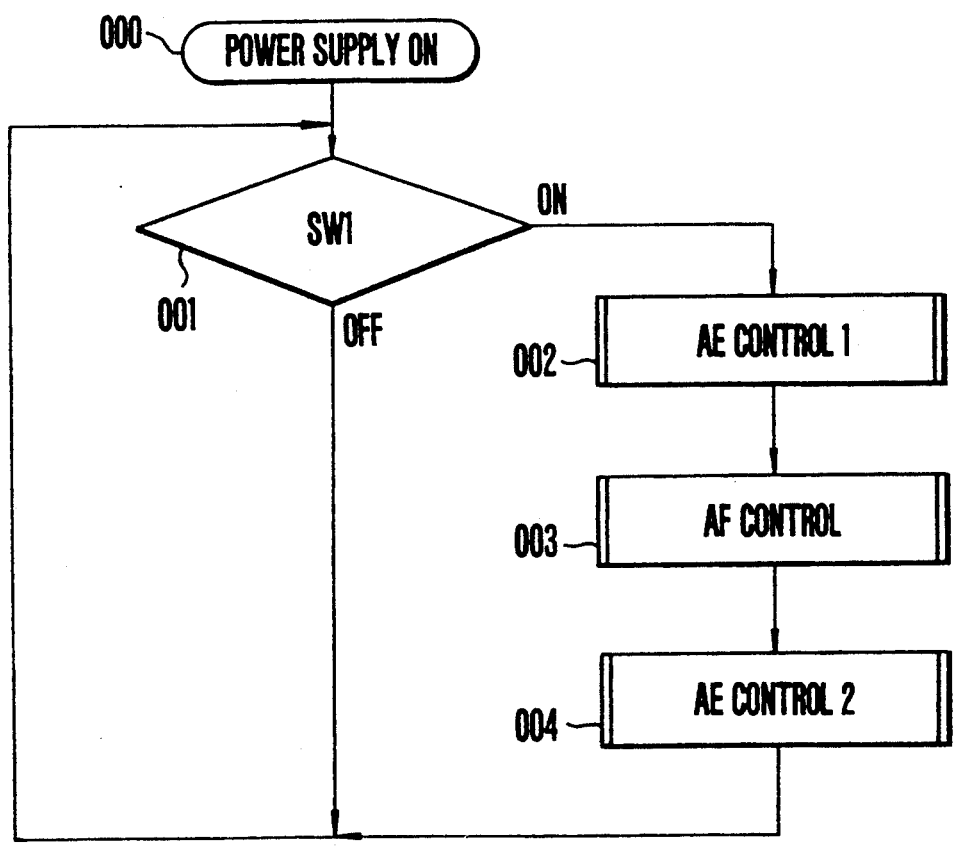

FIG. 5(a) is a flow chart very roughly showing the sequence of control processes of the whole camera. Referring to FIG. 5(a), after commencement of power supply to the circuit shown in FIG. 2, the microcomputer PRS begins to execute a program from a step 000 of FIG. 5(a). At a step 001: A check is made for the state of the switch SW1 which is arranged to be turned on by the first step stroke of a pushing operation on the shutter release button. If the switch SW1 is found to be in an off-state, the step 001 is repeated. If the switch SW1 is found to be in an on-state, the flow of operation comes to a step 002 to allow the camera to begin to operate.

At the step 002, a subroutine "AE Control 1" is executed to make checks for the states of switches and control systems. However, this subroutine has no direct relation to the present invention, the details of it are omitted from the following description.

After completion of the subroutine "AE Control 1", the flow comes to a step 003. At the step 003, a subroutine "AF Control" is executed, including: The storage of electric charge by the sensor; a focus detecting computing operation; and an automatic focusing action for driving the lens. After completion of the subroutine "AF Control", the flow comes to a next step 004. At the step 004, a subroutine "AE Control 2" is executed to carry out light measuring and displaying actions, etc. After completion of the subroutine "AF Control 2", the flow comes back to the step 001 to repeat the steps 002, 003 and 004 until the power supply is turned off.

A shutter release action is excluded from the flow chart and the above description, because it is not directly related to this invention.

Figure 5B:
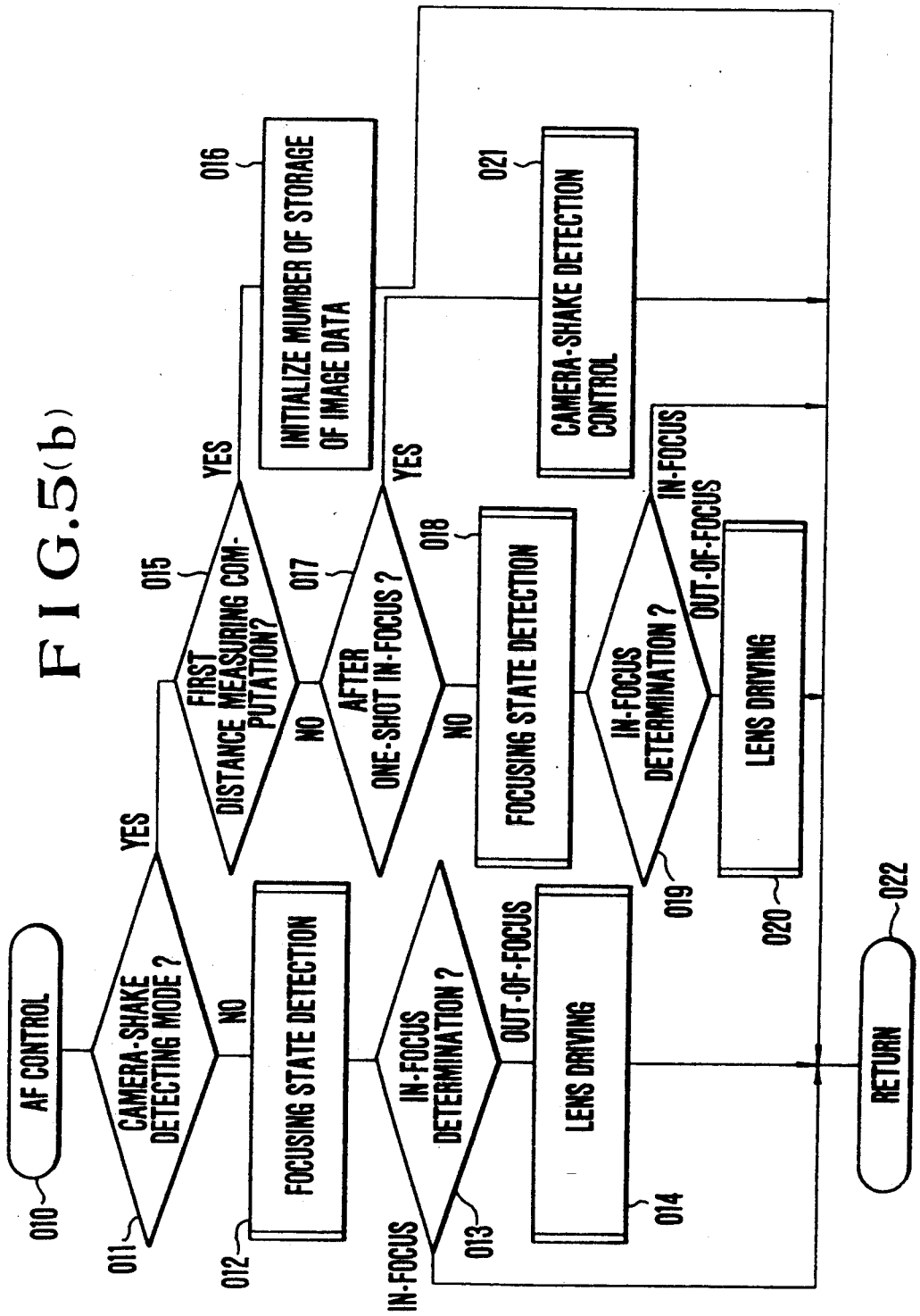

FIG. 5(b) is a flow chart showing the details of the subroutine "AF Control" to be executed at the above-stated step 003 of FIG. 5(a). Referring to FIG. 5(b), when the subroutine "AF Control" is called, the AF (automatic focusing) control is executed through a step 010 at a step 011 and steps ensuing on the step 011.

At the step 011: The photographing mode of the camera is checked to see if it is in a camera-shake detecting mode. If not, the flow of operation proceeds to a step 012 to execute a subroutine "Focusing State Detection". In this subroutine, the focusing state of each of the object's areas (sensor arrays SNS-1a, SNS-1b, SNS-4a, SNS-4b, SNS-2a, SNS-2b, SNS-3a and SNS-3b) is detected by obtaining the defocus degrees of these areas. The details of this process are as described in the publication of Japanese Laid-Open Patent Application No. Hei 1-291130 and are, therefore, omitted here. In brief, however, the electric charge storing action of the sensor for each area is controlled; a stored signal (image signal) is read out; and a defocus degree computing operation is performed on the image signal read out. For each area, the possibility or impossibility of focus detection by a known method is determined according to the contrast of the image signal or like practice. Further, a selecting action is performed on the defocus degree for each area and the defocus degree of a selected area is produced. An algorithm employed for the selection is, for example, arranged such that, among the defocus degrees of the areas determined to be focus-detectable, a defocus degree obtained for an object located at the nearest distance is selected. At a step 013: A subroutine "In-focus Determination" is executed. An in-focus state is determined to have been attained when the defocus degree of the above-stated selected area is within a given range of defocus values. The flow then returns to the start of the flow through a step 022. If the area selected is determined to be out of focus at the step 013, the flow comes to a step 014 to execute a subroutine "Lens Driving". In that subroutine, the lens is driven to a degree corresponding to the defocus degree obtained at the step 012. After completion of the lens driving subroutine, the flow comes to the step 022 to bring the subroutine "AF Control" to an end.

Meanwhile, if the camera is found to be in the camera-shake detecting mode at the step 011, the flow comes to a step 015. The camera-shake detecting mode is either set by means of a switch SWS or automatically set by the camera according to the condition of the object to be photographed. At the step 015: A check is made to see if the execution of the "AF Control" subroutine is in a first round. If so, the flow comes to a step 016. At the step 016: The number of storage of image data is initialized to zero. If the execution of the AF control subroutine is found to be not in the first round at the step 015, the flow comes to a step 017. At the step 017: A check is made to find if the current focusing state is obtained after an in-focus state has been determined for one shot for the first time during the process of repeated focus-detecting and lens-driving actions. If not, the flow proceeds to a step 018. At the step 018 and steps ensuing on the step 018: A subroutine "Focusing State Detection" is executed at the step 018. A subroutine "In-focus Determination" is executed at a step 019. A subroutine "Lens Driving" is executed at a step 020. After that, the flow comes to the step 022 to bring the AF control subroutine to an end.

These steps 018, 019 and 020 are identical with the steps 012, 013 and 014 described in the foregoing and are, therefore, omitted from description. However, the focusing state detecting action of the step 018 is performed on the assumption that the defocus degree representing the nearest area among other defocus degrees obtained from the middle area sensors SNS-1a, SNS-1b, SNS-4a and SNS-4b is to be selected. Therefore, at the steps 018, 019 and 020, the lens is focused on an object located in the middle area. Further, when the lens is determined to be in focus at the step 019, an in-focus flag is set. The set state of this flag is detected at the step 017 described above in determining whether or not the current focusing state is obtained after the one-shot in-focus state has been obtained.

Figure 1:
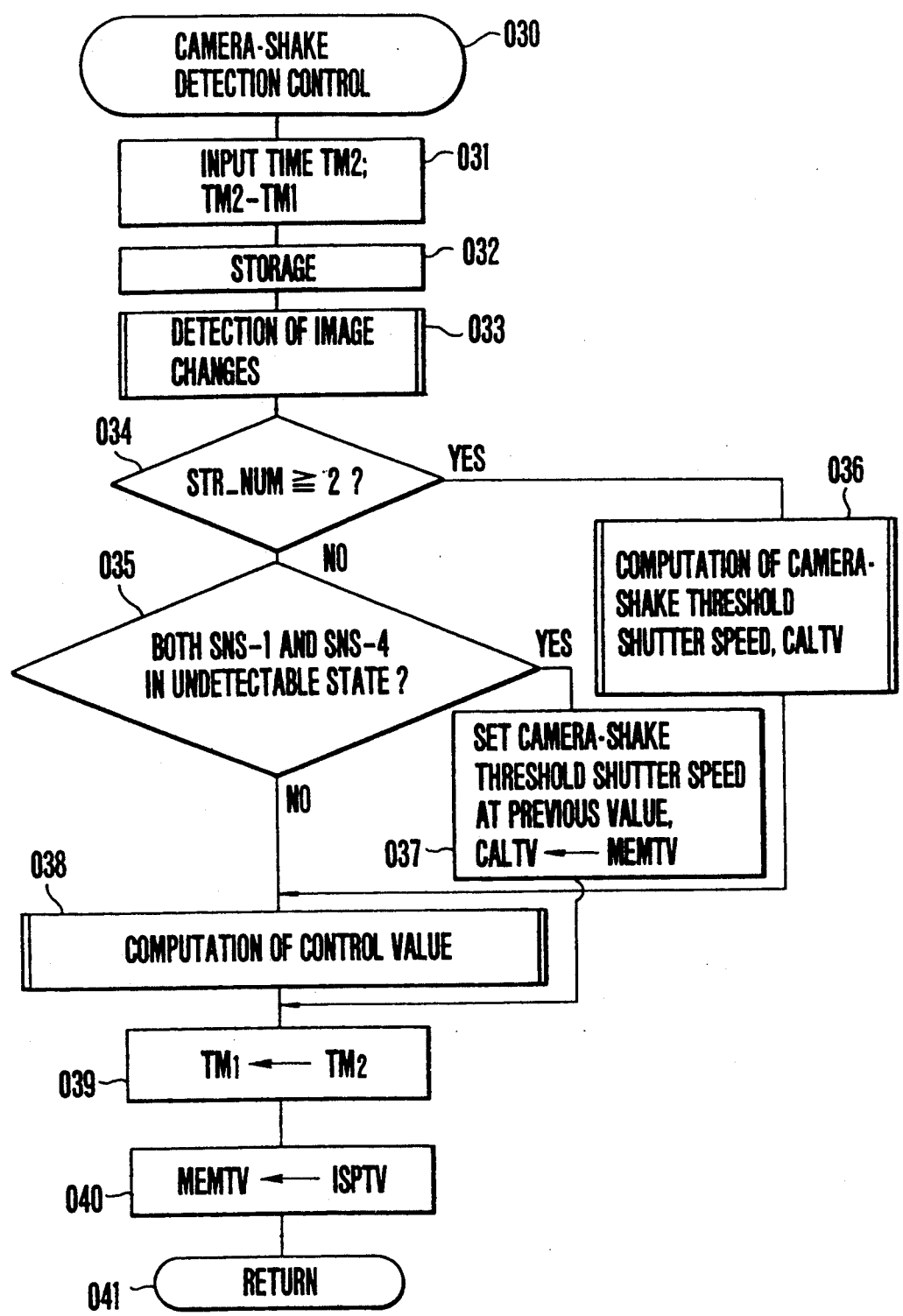
FIG. 1 is a flow chart showing the operation of a camera which is provided with a camera-shake detecting device arranged according to this invention.

If the current focusing state is determined to exist after the one-shot in-focus state at the step 017, the flow comes to the step 021. At the step 021: A "Camera-shake Detection Control" subroutine is executed in a manner as shown in detail in FIG. 1. When the camera-shake detection control subroutine is called, the flow comes via a step 030 to a step 031 to execute the step 031 and steps ensuing from the step 031 of FIG. 1 as described below:

Referring to FIG. 1, at the step 031, the current time data TM2 is first obtained. This time data TM2 is obtained by reading the counted value of a 16-bit free-running counter which is disposed within the microcomputer PRS. Meanwhile, another time data TM1 is obtained when the camera-shake detection control subroutine is previously executed. The time data TM1 is subtracted from the time data TM2 (TM2−TM1). The value (TM2−TM1) thus obtained represents a time interval during which the camera-shake detection control subroutine is executed. The flow then proceeds to a next step 032.

At the step 032: A subroutine "Storage" is executed. By this subroutine, the sensor is allowed to store electric charge and the image signal is read out from the sensor. In this case, the sensor of every area is allowed to store electric charge and the image signal is read out from every one of them. Upon completion of the subroutine "Storage", the flow comes to a step 033. At the step 033: A subroutine "Detection of Image Changes" is executed. FIG. 5(c) is a flow chart showing that subroutine.

When the subroutine "Detection of Image Changes" is called, the flow comes via a step 050 to a step 051 to detect image changes at the step 051 and steps ensuing from the step 051.

Referring to FIG. 5(c), the subroutine "Detection of Image Changes" are executed as follows: At the step 051: A check is made for the number STR_NUM of storage of image data required for detecting the degree of camera shake. If the number of storage is zero, the flow comes to a step 061 as the degree of camera shake is hardly detectable. If the number STR_NUM of storage is found to be at least one, the flow proceeds to a step 052. At the step 052: The degree of deviation (PRDCT_V) of the image of the middle vertical sensor SNS-1a is computed. The deviation degree means a difference between an image signal currently stored and a previously stored image signal. The previous image signal is retained at the step 061. At a step 053: The deviation degree (PRDCT_H) of the image of the middle horizontal sensor SNS-4a is computed in the same manner as at the step 052. At a step 054: A check is made to find if both the vertical and horizontal middle sensors SNS-1 and SNS-4 are in a detectable state. In determining the detectable state, the state of contrast or like parameter is found from the image signals of the sensors SNS-1 and SNS-4 to determine an undetectable state such as a low-contrast state. If both of them are found to be in the detectable state, the flow comes to a step 055. At the step 055: The image deviation degree of the sensor SNS1a is compared with that of the sensor SNS-4a. If the image deviation degree of the sensor SNS-1a is found to be larger, the flow comes to a step 057. At the step 057: The image deviation degree of the sensor SNS-1a is determined to be used as an image deviation degree PRDCT in computing a camera-shake threshold shutter speed. If the image deviation degree of the other sensor SNS-4a is found to be larger at the step 055, the flow comes to a step 058. At the step 058: The image deviation degree of the sensor SNS-4a is determined to be used in computing the camera-shake threshold shutter speed. If both the sensors SNS-1 and SNS-4 are not found to be in a detectable state at the step 054, the flow comes to a step 056. At the step 056: A check is made to find if the sensor SNS-1 is in a detectable state. If so, the flow comes to a step 059. At the step 059: The image deviation degree of the sensor SNS-1a is determined to be used as the image deviation degree PRDCT in computing the camera-shake threshold shutter speed. If the sensor SNS1 is found to be in an undetectable state at the step 056, the flow comes to a step 060. At the step 060: The image deviation degree of the sensor SNS-4a is determined to be used as the image deviation degree PRDCT in computing the camera-shake threshold shutter speed. At a next step 061: An image signal which is necessary in subsequently computing the image deviation degree is memorized.

At a step 062: A check is made to find if both the vertical middle sensor SNS-1 and the horizontal middle sensor SNS-4 are in an undetectable state. If both of them are found to be in an undetectable state, the flow comes to a step 067. At the step 067 : The counted value of a counter NG_COUNT, which is arranged to count how many times the undetectable state has consecutively occurred, is incremented by one. At a step 068: A check is made to find if the undetectable state has consecutively occurred at least three times. If so, the flow comes to a step 069. At the step 069: A flag TBLFLG which is arranged to be used for display control and to indicate that the camera-shake degree is detectable (or in process of detection) is cleared. When this flag is at "1", a display lights up as will be described later. In this case, the flag TBLFLG is arranged to be cleared only after the undetectable state has consecutively been found three times, because: If the display is lit up or put out for every cycle of detection, the display would flicker conspicuously to give the photographer an unreliable impression. Whereas, the arrangement to put out the display only when the undetectable state occurs consecutively three times can effectively prevent the display from flickering, so that no disagreeable impression is given to the photographer.

In a case where the undetectable state is found to have occurred less than three times at the step 068, the flow comes to a step 070. AT the step 070: The number of storage of image data required for detecting the camera-shake degree is set at 1. The flow then comes to a step 071.

If both the sensors SNS-1 and SNS-2 are not found to be in an undetectable state at the step 062 (both or one is detectable), the flow comes to a step 063. At the step 063: The counter NG_COUNT which is arranged to count how many times the undetectable state has consecutively occurred is cleared. At a step 064: The flag TBLFLG which indicates that the camera-shake is detectable, i.e., in process of detection, is set at "1".

Next, at a step 065: A check is made to find if the number STR_NUM of storage of image data to be used in detecting the degree of camera shake is 2 or less. If so, one is added to the number STR_NUM of storage of image data. If the number STR_NUM of storage of image data is found to be 3 or more at the step 065, the flow comes to a step 071. At the step 071, the subroutine "Detection of Image Changes" comes to an end.

As described above, the photographer is informed of the camera-shake detecting state, i.e., whether the camera shake is detectable or undetectable. Therefore, the embodiment enables the photographer to find apposite timing for taking a picture without being affected by a camera shake. The camera shake detection control subrouting is further described below again referring to FIG. 1:

After execution of the step 033, the flow comes to a step 034. At the step 034: The number of storage of image data is checked to find if it is at least 2. If not, the flow comes to a step 035. If it is at least 2, the flow comes to a step 036. At the step 035: A check is made to find if both the sensors SNS-1 and SNS-4 are in an undetectable state. If one of or both of the sensors SNS-1 and SNS-4 are found to be in a detectable state, the flow comes to a step 038. At the step 038: A subroutine "Computation of Control Value" is executed. If both the sensors SNS-1 and SNS-4 are in an undetectable state, the flow comes to a step 037.

At the step 037: To retain the previous value because of the undetectable state, the control value MEMTV previously obtained is determined to be used as it is for the computed value CALTV of the camera-shake threshold shutter speed. The reason for keeping the previous control value when the degree of camera-shake is undetectable is as follows: If the shutter time is set at a maximum high speed, the shutter time display greatly varies every time the camera-shake degree is undetectable to make the display not easily sightable. Further, since the current value and the previous value are averaged to give a mean value for control, as will be described later herein, a long time is required in shifting the shutter speed to a speed apposite to the degree of camera shake when the camera-shake degree become detectable. Whereas, the arrangement to hold the previous control value when the camera-shake degree is undetectable prevents the shutter speed display from varying too much, so that the shutter speed display can be smoothly changed when the camera-shake degree becomes detectable.

A subroutine "Computation of Camera-Shake Threshold Shutter Speed" which is to be executed at the step 036 is as follows: The camera-shake threshold shutter speed is computed on the following concept:

With the changing speed of an image on the focal plane assumed to be v (mm/s), the shutter time to be t (s) and the diameter of permissible circle of confusion to be $\delta$ (0.035 mm), a photograph to be taken is believed to be unaffected by the camera shake on the following condition:

$$V \times t \leq \delta \ (mm)$$

Therefore, the shutter time t is computed as:

$$t = 0.035/v \ (s)$$

With the changing degree of the image on the focal plane assumed to be r (mm) and the changing degree measuring time to be ts (s), the image changing speed v (mm/s) can be expressed as follows:

$$v = r/ts \ (mm/s)$$

In the above formula v=r/ts, "r" represents a value proportional to the value PRDCT which is obtained by the routine of FIG. 5(c); "ts" a time interval at which the image signal is taken in for the purpose of obtaining the value PRDCT, that is, a time interval during which the sub-routine of FIG. 1 is executed and thus can be expressed by the value "TM2−TM1" which is obtained at the step 031 of FIG. 1. Therefore, the result of the formula t=0.035/v can be obtained from the data PRDCT and TM2−TM1. The subroutine of the step 036 is executed to obtain the shutter time t on the basis of the above-stated formula. As apparent from the above formula, the camera-shake threshold shutter time t changes to a higher speed time value accordingly as the degree of image deviation per unit time increases. Further, in the subroutine of FIG. 5(c), the larger of the degrees of deviation PRDCT_V and PRDCT_H is used, for the purpose of effectively preventing the adverse effect of camera-shake by employing a higher shutter speed as the camera-shake threshold shutter time.

Figure 5D:
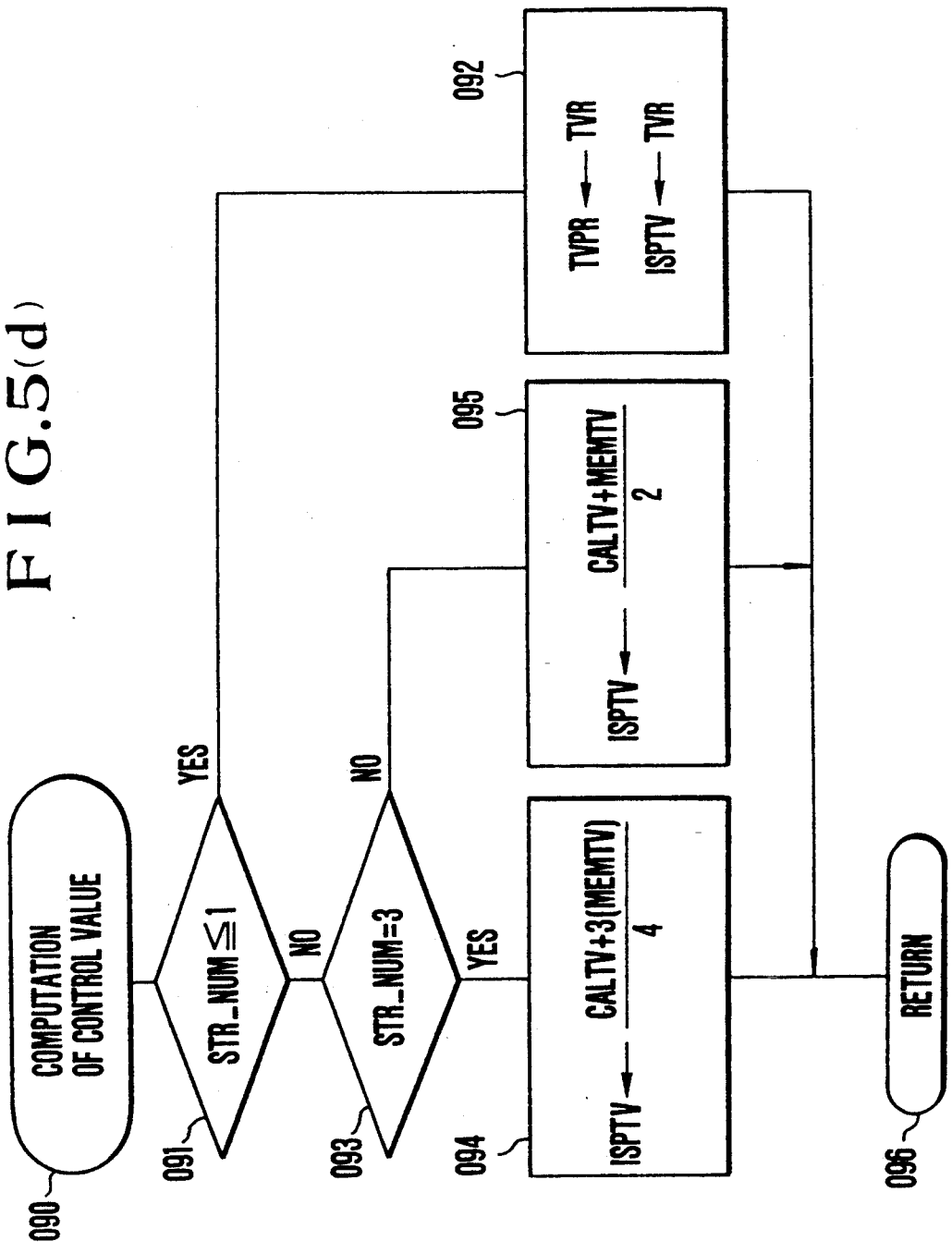

Again referring to FIG. 1, the flow is further described as follows: At a step 038, a subroutine "Computation of Control Value" is executed. FIG. 5(d) is a flow chart showing the subroutine "computation of control value" of the step 038. Referring to FIG. 5(d), when the subroutine "computation of control value" is called, the flow comes via a step 090 to a step 091 to execute control over the control value computing operation at the step 091 and steps ensuing on the step 091. At the step 091: A check is made to find if the number of storage of image data necessary for detecting the degree of camera shake is 1 or less. If so, the flow comes to a step 092. In this instance, the number of storage of image data is insufficient for detecting the degree of camera shake. Therefore, the camera-shake detection control is performed by using an ordinary shutter speed based on a measured light value. Hence, the ordinary shutter speed value TV based on the measured light value is employed as the actual control value ISPTV. The flow then comes to a step 096. In this instance, during a period from the start of camera-shake detection and before the camera shake becomes detectable, a shutter speed is set according to an ordinary program chart, because: If, for example, the shutter speed is set at a maximum speed time value, it might greatly differ from a value obtained under a normal light measuring condition to give an unnatural impression on the photographer. Besides, in controlling an actual exposure, the shutter speed tends to result in an inappropriate exposure depending on the brightness of the object. In view of this, the shutter time for an ordinary light measuring condition is used in this instance. This not only ensures a smooth display change but also prevents any inappropriate exposure even when exposure control is performed at that shutter speed.

In a case where the number STR_NUM of storage of image data is found to be larger than 1 at the step 091, the flow comes to a step 093. At the step 093: A check is made to find if the number STR_NUM of storage is 3. If so, the flow proceeds to a step 094. If not, i.e., if the number of storage is 2, the flow comes to a step 095.

At the step 094: Since the number of storage of image data is at least 3, a control value ISPTV is obtained in accordance with the following formula which reflects the weight of the results of previous detection:

$$ISPTV \leftarrow (CALTV + 3 (MEMTV))/4$$

In the above formula, "CALTV" represents the camera-shake threshold shutter time value obtained at the step 036; and "MEMTV" represents the control value ISPTV obtained by the previous camera-shake detection as set at the step 040 of FIG. 1. After completion of this computation, the flow comes to a step 096.

At the step 095: Since the number of storage of image data is 2, the control value ISPTV is obtained in accordance with the following formula which gives the average of the current and previous results of detection:

$$ISPTV \leftarrow (CALTV + MEMTV)/2$$

After the computation, the flow comes to a step 096 to end the subroutine "Computation of Control Value".

Again coming back to FIG. 1, the flow is further described as follows: After the step 038, the flow comes to a step 039. At the step 039: The current storing start time TM2 is memorized as the time TM1 for use in detecting the camera shake next time. At a step 040: The control value ISPTV which is obtained by the current camera-shake control is stored as MEMTV for the next camera-shake detection. The flow then comes to a step 041 to terminate the subroutine "Camera Shake Detection Control".

Again reference is made to FIG. 5(b). After the end of the subroutine "Camera Shake Detection Control", the flow comes to a step 022 to end the subroutine "AF Control". Outputs obtained at the end of the AF control subroutine include the control value ISPTV which is computed on the basis of the degree of camera shake detected and a flag TBLFLG which indicates that the camera-shake detection is in process.

Referring again to FIG. 5(a), the flow comes to a step 004 after the end of the AF control subroutine. At the step 004: A subroutine "AE Control 2" is executed. In this subroutine, control is performed over light measuring, computing and displaying actions. However, the following description of this subroutine is limited to such parts that are related to this invention.

FIG. 5(e) is a flow chart showing the subroutine "AE Control 2" to be executed at the above-stated step 004. When this subroutine is called, the flow comes to a step 110 to execute it at a step 111 and subsequent steps. At the step 111: A subroutine "Light Measurement" is executed. By this, the luminance of the object is measured by measuring light. Control over the light measuring action is not directly related to this invention and is, therefore, omitted from further description.

At a next step 112, a subroutine "AE Computation" is executed. FIG. 5(f) is a flow chart showing this AE computing subroutine.

Referring to FIG. 5(f), when the subroutine "AE Computation" is called, the flow comes to a step 120 to execute the process of AE computation at step 121 and steps ensuing from the step 121. At the step 121: Display control flags FLASH, MARKFLASH1, MARKFLASH2, etc., are first cleared. At a step 122: An exposure value EV is computed. The luminance of the object measured at the step 111, the sensitivity ISO of the film and an exposure compensation value CMP are added together in obtaining the exposure value EV. At a next step 123: A check is made to find if the camera is in the camera-shake detecting mode. If not, the flow comes to a step 124. If so, the flow comes to a step 127.

The operation to be performed with the camera not in the camera-shake detecting mode is first described as follows: In the case of this embodiment, the camera has many photographing modes including, for example, a program mode, a shutter (TV) priority mode, an aperture (AV) priority mode, a manual mode, a green mode, etc. The following description, however, roughly covers only the program mode, because other photographing modes are not directly related to this invention. At a step 124: A shutter speed TV and an aperture value AV are computed and obtained from the exposure value EV which is obtained by adding together the luminance of the object, the sensitivity of the film and the exposure compensation value. The computed value AV is a value adjusted to an aperture within a range from the maximum aperture F number to the minimum aperture F number of the photo-taking lens. The computed value TV is a shutter speed value adjusted to a speed within a range from a minimum shutter speed to a maximum shutter speed. Thus, these values AV and TV are shifted within a range of control of the camera.

At a step 125: The sum of the values TV and AV is compared with the value EV to find if they coincide with each other. In other words, a check is made for a high-luminance warning or low-luminance warning. If the result of the check shows the high-luminance warning or low-luminance warning, the flag FLASH is set at "1" to give a blinking display of the value TV or AV at a step 126 and then the flow comes to a step 133. If the result of the check does not show the high-luminance warning or low-luminance warning, the flow proceeds to the step 133 as it is.

If the camera is determined at the step 123 to be in the camera-shake detecting mode, the flow comes to the step 127. At the step 127: A shutter priority computing operation is carried out in accordance with the following formula, by using as a set TV value, the control value ISPTV which is obtained by detecting the camera shake degree as shown in FIG. 5(d):

$$AV \leftarrow EV - ISPTV$$

The aperture value AV which is obtained by the above formula is corrected and adjusted to a value within the range from the maximum aperture F number to the minimum aperture F number of the photo-taking lens.

For example, this aperture value AV would be 1.4 if the shutter speed ISPTV computed according to the camera shake degree is 1/125 sec while the exposure value EV is 8. In this instance, if the maximum aperture F number of the photo-taking lens is F 1.8, the above-stated aperture value F 1.4 is outside of an adoptable range. Therefore, in this instance, the aperture value is set at F 1.8. In other words, the aperture value is set at its limit value in cases where the aperture value AV comes to exceed an aperture limit controllable by the camera.

At a step 128: The shutter time value TV is again computed on the basis of the aperture value AV computed at the step 127. Since the aperture value might have been corrected at the step 127, the shutter speed is computed over again on the basis of the aperture value for the purpose of ensuring an apposite exposure.

The shutter speed value TV computed at the step 128 coincides with the control value ISPTV computed according to the camera shake degree if the aperture value AV has not been corrected at the step 127. However, if the aperture value AV has been corrected at the step 127, the shutter speed value TV computed at the step 128 is no longer equal to the control value ISPTV computed in accordance with the degree of camera shake.

At a step 129: The shutter speed value TV computed at the preceding step 128 is compared with the control value ISPTV which is computed in accordance with the detected degree of camera shake. If the value TV is found to be equal to the value ISPTV, the flow comes to a step 133. If not, the flow comes to a step 130. At the step 130: A check is made to find if the value TV differs from the value ISP TV by one step or more. If the difference is found to be less than one step, the flow comes to a step 131. At the step 131: A flag MARKFLASH1 which indicates that the value TV differs by less than one step from the value ISPTV is set at "1" and the flow comes to the step 133. If the value TV is found at the step 130 to differ by one step or more from the value ISPTV, the flow comes to a step 132. At the step 132: A flag MARKFLASH2 which indicates that the difference between the value TV and the value ISPTV is one step or more is set at "1" together with the flag MARKFLASH1. After that, the flow comes to the step 133. At the step 133: The subroutine "AE Computation" comes to an end. Further, the camera is arranged to perform a photographing operation at the shutter time determined at the steps 128 and 125 of this subroutine.

As apparent from the above description of the steps 127 to 133, the aperture value is set at a maximum open value and the shutter time is once again computed in cases where the luminance of the object does not allow any apposite exposure control on the basis of a shutter speed obtained according to the degree of camera shake and results in an underexposure even at the maximum aperture value. This arrangement makes an apposite exposure possible. Further, under such a condition, the photographer must be informed of the possibility of the adverse effect of the camera shake and necessity of precaution. Referring again to FIG. 5(e), after the execution of the step 112, the flow comes to a step 113 to execute a subroutine "Display" in a manner as shown in FIG. 5(g) which is also a flow chart.

Referring to FIG. 5(g), the subroutine "Display" of the above-stated step 113 is executed by the following steps: When the "display" subroutine is called, the flow comes to a step 140 to execute display processes through steps 141, 142 and 143. At the step 141: A subroutine "External Liquid Crystal Display" is executed. This subroutine is provided for control over an external display part of the camera. However, since this part is not related directly to this invention, the details of it are omitted from further description. At the next step 142: A subroutine "Display within Viewfinder" is executed.

Figure 5H:
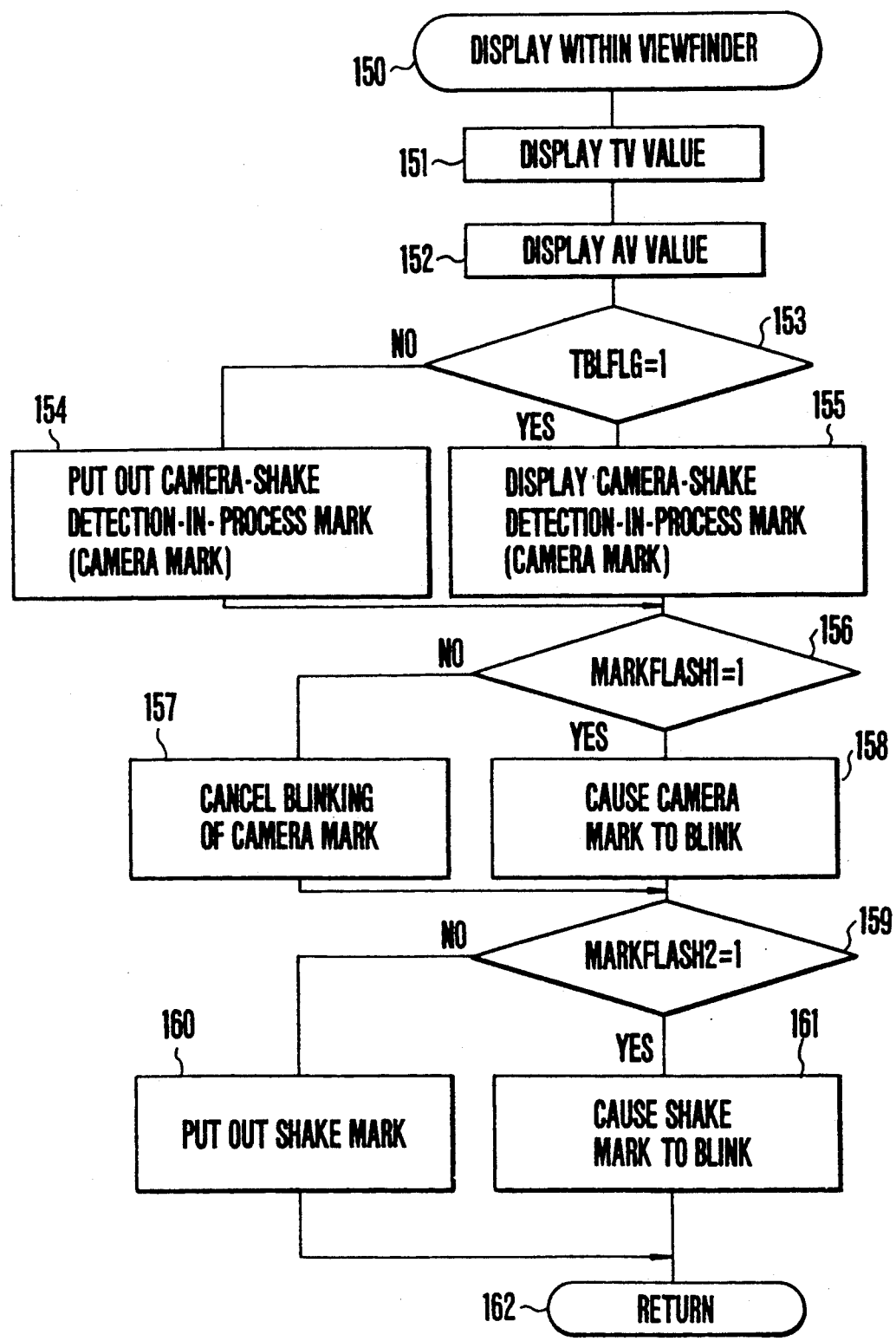

FIG. 5(h) is a flow chart showing the subroutine "Display Within Viewfinder" to be executed at the above-stated step 141 of FIG. 5(g). When this subroutine is called, the flow comes to a step 150 to make displays within the viewfinder of the camera at a step 151 and steps ensuing thereon. Before the description of the flow, displays within the viewfinder are described as follows:

FIG. 6(a) shows everything to be displayed within the viewfinder. A reference numeral 101 denotes a display indicating a state in which the camera shake is detectable (hereinafter referred to as a camera mark). A numeral 102 denotes a display indicating impossibility of control at a shutter speed computed according to the degree of camera shake (hereinafter referred to as a shake mark). A numeral 103 denotes a display indicating that the AE is locked. Reference numerals 104 to 107 denote a display showing a shutter speed. A numeral 108 denotes a display indicating the state of an exposure made at the shutter speed and the aperture value set in a manual mode. Numerals 109 to 111 denote a display indicating an aperture value. A numeral 112 denotes a display indicating a plus or minus correction in a case where an exposure compensation value is set. A numeral 113 denotes a display indicating completion of a charging process on a flash device. A numeral 114 denotes a display indicating that an in-focus state is attained.

Referring now to the flow chart of FIG. 5(h), the subroutine "Display Within Viewfinder" is described as follows: At a step 151, the shutter speed is displayed. In a case where the shutter speed is 1/125 sec, for example, the display is made as shown in FIG. 6(b). Further, what is displayed at the step 151 is the shutter time obtained at the steps 128 and 124 of FIG. 5(f).

Figure 6D:

At a next step 152: An aperture value is displayed. In a case where the aperture value is F 5.6, for example, the display is made as shown in FIG. 6(c). This display value is obtained at the steps 127 and 124 of FIG. 5(f). At a step 153: The flag TBLFLG which indicates whether or not the camera shake has been detected is checked to find if it is at "1". If so, the camera mark 101 of FIG. 6(a) is displayed as shown in FIG. 6(d). If the flag TBLFLG is found at "0", the camera mark is not lighted up and, therefore, the state of display is the same as the state shown in FIG. 6(c).

Figure 6E:

At a step 156: The computed shutter speed ISPTV obtained from the degree of camera shake is compared with the actual shutter speed to find if they differ by less than one step. In other words, the flag MARKFLASH1 is checked to find if it is at "1". If the flag is found to be at "1", the flow comes to a 158, At the step 158: The camera mark is caused to blink in a cycle of twice per sec. to inform the photographer of this as shown in FIG. 6(e). If the flag is found to be at "0", the flow comes to a step 157. At the step 157: The camera mark is stopped from blinking. Then, the state of display becomes the same as in FIG. 6(d).

Figure 6F:
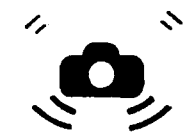

At a step 159: The shutter speed ISPTV which is computed and obtained from the degree of camera shake is compared with the actual shutter speed to find if they differ by one step or more. In other words, the flag MARKFLASH2 is checked to find if it is at "1". If so, the flow comes to a step 161. At the step 161: To inform the photographer of this, both the camera mark and the shake mark are caused to blink in the cycle of twice per sec. as shown in FIG. 6(f). If the flag MARK-FLASH2 is found to be at "0" at the step 159, the flow comes to a step 160 to put out the shake mark. After that, the flow comes to a step 162 to bring the subroutine "Display Within Viewfinder" to an end.

Again reference is made to FIG. 5(g). After completion of the step 142, the flow come to a step 143 to terminate the subroutine "Display".

Referring again to FIG. 5(e), after completion of the step 113, the flow comes to a step 114 to terminate the subroutine "AE Control 2".

The program of the embodiment which is arranged as described in the foregoing enables the camera to operate as follows: In the camera-shake detecting mode: The camera-shake threshold shutter time is obtained by the subroutine of FIG. 5(d) from the degree of image deviation found by the subroutine of FIG. 5(c). This shutter time is displayed within the viewfinder by the subroutine of FIG. 5(b). Further, in the camera-shake detecting mode, since the flag TBLFLG is found to be at "1" at the step 064 of FIG. 5(c), the camera mark is displayed, in that instance, to show that the camera-shake detecting action is being performed. In the event of an inadequate image signal of the sensor, since the number STR_NUM is set at 1 at the step 070 of FIG. 5(c) even in the camera-shake detecting mode, the camera-shake threshold shutter speed which is previously obtained is set and displayed as the shutter speed value ISPTV at the step 036 of FIG. 1.

Further, even in a case where the image signal becomes inadequate while the camera mark is on display with the camera-shake detecting action performed, the light of the camera mark display is put out when the inadequate state of the image signal is found for a given consecutive number of times (for a given period of time) at the steps 068 to 070 of FIG. 5(c). Therefore, the camera mark is never displayed and put out in a cycle of an excessively short period of time.

Further, in a case where the shutter speed value obtained from the result of the camera-shake detecting action is changed through an exposure computation, this change is indicated by the blinking display of the camera mark and/or that of the shake mark at the steps 127 to 132 of FIG. 5(f) and the steps 156 to 161 of FIG. 5(b). This gives a timely warning to the photographer.

Further, before the execution of the camera-shake detecting action, that is, when the number STR_NUM of storage of image data is 0 or 1, the step 092 of FIG. 5(d) is executed. Therefore, in that case, a shutter time value obtained in accordance with the program on the basis of a measured light value is set and displayed in place of the shutter time value ISPTV.

As described in the foregoing, in accordance with this invention, the camera-shake detecting state is arranged to be displayed. This arrangement enables the photographer to confirm the detecting state before actually taking a photograph. Further, this display is arranged to be put out only when an undetectable state consecutively occurs three times. That arrangement effectively mitigates flickering of the display of the camera-shake detecting state.

In cases where any correct exposure control is hardly possible on the basis of a shutter speed value computed and obtained from a detected degree of camera shake, the invention enables the camera to perform correct exposure control by adjusting the shutter speed and, at the same time, to inform the photographer of the possibility of an adverse effect of the camera shake. The photographer is thus enabled to know in time the shift of the camera-shake threshold shutter speed. Further, in displaying the shutter time, a shutter speed obtained according to a program chart is displayed in the initial stage of the display, from the start of the camera-shake detecting action until a camera shake becomes detectable. The shutter time display is changed to the computed camera-shake threshold shutter time when the camera-shake detecting action is carried out. After that, if the degree of camera shake becomes undetectable any longer, a previously obtained camera-shake threshold shutter time is allowed to be continuously displayed. This effectively prevents any abrupt change in the displayed value.

What is claimed is:

1. A camera having a camera-shake detecting device, comprising:
   a) a shake detecting circuit provided with a sensor for detecting a shake of the camera;
   b) a determining circuit arranged to determine whether a shake detecting action of said shake detecting circuit can be adequately performed; and
   c) indication means for indicating that said shake detecting action is not performed when said determining circuit has determined that said shake detecting action cannot be adequately performed.

2. A camera according to claim 1, further comprising an indication circuit arranged to cause said indication means to indicate that said shake detecting action is not performed when said determining circuit has continuously determined for a predetermined period of time that said shake detecting action cannot be adequately performed.

3. A camera according to claim 1, further comprising an indication circuit arranged to cause said indication means to indicate that said shake detecting action is not performed when said determining circuit has consecutively determined for a predetermined number of times that said shake detecting action cannot be adequately performed.

4. A camera according to claim 2, further comprising a warning circuit arranged to give warning of a camera shake on the basis of the shake of the camera detected by said shake detecting circuit.

5. A camera according to claim 3, further comprising a warning circuit arranged to give warning of a camera shake on the basis of the shake of the camera detected by said shake detecting circuit.

6. A camera according to claim 2, wherein said sensor is a light receiving sensor arranged to receive light of an object image, and wherein said determining circuit is arranged to determine said shake detecting action cannot be adequately performed when an output of said sensor is in a predetermined state.

7. A camera according to claim 3, wherein said sensor is a light receiving sensor arranged to receive light of an object image, and wherein said determining circuit is arranged to determine said shake detecting action cannot be adequately performed when an output of said sensor is in a predetermined state.

8. A camera according to claim 1, further comprising a computing circuit arranged to obtain, on the basis of the shake of the camera detected by said shake detecting circuit, a shutter speed which causes no camera shake.

9. A camera according to claim 3, further comprising a computing circuit arranged to obtain, on the basis of the shake of the camera detected by said shake detecting circuit, a shutter speed which causes no camera shake.

10. A camera comprising:
    a) a shake detecting circuit provided with a sensor for detecting a presently occurring shake parameter experienced by the camera and providing an output indicative of the detected shake parameter;
    b) a camera-shake preventing time computing circuit arranged to obtain, on the basis of said output of said shake detecting circuit, a first shutter time which causes no camera shake;
    c) a light measuring circuit for providing an output indicative of presently measured brightness of an object scene;
    d) computing circuit means providing output indication of a second shutter time responsively to said output of said light measuring circuit and a predetermined maximum aperture value; and
    an indication circuit arranged to provide output indication when said first shutter time obtained by said computing circuit is shorter than said second shutter time.

11. A camera according to claim 10, further comprising a shutter control circuit arranged to set a shutter time at said first shutter time when said first shutter time is longer than said second shutter time and at said second shutter time when said first shutter time is shorter than said second shutter time.

12. A camera comprising:
    a) a shake detecting circuit arranged to repeatedly detect a shake of the camera;
    b) a computing circuit arranged to obtain, on the basis of a detection output of said shake detecting circuit every time the shake of the camera is detected by said shake detecting circuit, a shutter time which causes no camera shake;
    c) a display circuit for displaying said shutter time obtained by said computing circuit;
    d) a determining circuit arranged to determine whether a shake of the camera is in an undetectable state every time a shake detecting action of said shake detecting circuit is performed; and
    e) a keeping circuit arranged to keep a display made by said display circuit at a shutter time value obtained by said computing circuit in a preceding shake detecting action when said determining circuit has determined that the shake of the camera is in an undetectable state.

13. A camera having a shake detecting device, comprising:
    a) a detecting circuit having a sensor to detect a blur of the camera, said detection circuit being arranged to repeat the detecting action;
    b) a determining circuit for determining whether the blur detecting action is performed adequately; and
    c) an output circuit for generating an output when the determining circuit determines that the blur detecting action of the detecting circuit is not performed adequately successively for a predetermined period of time or for a predetermined number of detection actions.

14. A camera having a shake detecting device, comprising:
    a) a shake detecting circuit provided with a sensor for detecting a shake of the camera;
    b) a determining circuit arranged to determine whether a shake detecting action of said shake detecting circuit is adequately performed, and
    c) indication means arranged to differentiate its indication between when the determining circuit determines that the shake determining action is performed adequately and when the determining circuit determines the detecting action is not performed adequately.

15. A camera comprising:
    a) a shake detecting circuit provided with a sensor for detecting a presently occurring shake parameter experienced by the camera and providing an output indicative of the detected shake parameter;
    b) a camera-shake preventing time computing circuit arranged to obtain, on the basis of said output of said shake detecting circuit, a first shutter time which causes no camera shake;
    c) a light measuring circuit for providing an output indicative of presently measured brightness of an object scene;
    d) computing circuit means providing output indication of a second shutter time responsively to said output of said light measuring circuit; and
    e) an indication circuit arranged to provide an output indication when said first shutter time obtained by said computing circuit is shorter than said second shutter time, which is determined for a correct exposure on the basis of a maximum aperture value and said output of said light measuring circuit.

16. A camera according to claim 15, further comprising a shutter control circuit arranged to set a shutter time at said first shutter time when said first shutter time is longer than said second shutter time and at said second shutter time when said first shutter time is shorter than said second shutter time.

* * * * *